(12) United States Patent
Keith et al.

(10) Patent No.: US 11,528,953 B2
(45) Date of Patent: Dec. 20, 2022

(54) DISPLAY EMBEDDED VISOR HELMET MOUNTED DISPLAY

(71) Applicant: Rockwell Collins, Inc., Cedar Rapids, IA (US)

(72) Inventors: Christopher A. Keith, Wilsonville, OR (US); Andrew M. Jarrett, Cedar Rapids, IA (US); Ryan Chenevert, West Linn, OR (US); Garrett Graham, Canby, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 148 days.

(21) Appl. No.: 16/877,662

(22) Filed: May 19, 2020

(65) Prior Publication Data
US 2021/0361020 A1 Nov. 25, 2021

(51) Int. Cl.
| | |
|---|---|
| A42B 3/22 | (2006.01) |
| A42B 3/30 | (2006.01) |
| G02B 27/01 | (2006.01) |
| G02B 1/14 | (2015.01) |
| G02B 27/00 | (2006.01) |
| A42B 3/04 | (2006.01) |

(52) U.S. Cl.
CPC .............. *A42B 3/228* (2013.01); *A42B 3/30* (2013.01); *G02B 27/0172* (2013.01); *G02B 27/0176* (2013.01)

(58) Field of Classification Search
USPC .......................................................... 345/8
See application file for complete search history.

(56) References Cited

U.S. PATENT DOCUMENTS

| | | | |
|---|---|---|---|
| 5,367,402 A * | 11/1994 | Holmes ................ | G02B 23/125 244/122 AG |
| 6,012,176 A | 1/2000 | Daley, III | |
| 6,195,206 B1 | 2/2001 | Yona et al. | |
| 8,040,292 B2 | 10/2011 | Ronzani et al. | |
| 8,810,913 B2 | 8/2014 | Simmonds et al. | |
| 8,842,368 B2 | 9/2014 | Simmonds et al. | |
| 9,400,384 B2 | 7/2016 | Griffith | |
| 9,819,843 B2 | 11/2017 | Adams | |
| 9,891,705 B1 | 2/2018 | Lahr et al. | |
| 10,139,644 B2 | 11/2018 | Rong et al. | |
| 10,216,265 B1 | 2/2019 | Kirchner et al. | |

(Continued)

FOREIGN PATENT DOCUMENTS

| | | |
|---|---|---|
| CN | 207220273 U | 4/2018 |
| EP | 2215513 B1 | 5/2015 |

(Continued)

OTHER PUBLICATIONS

Extended Search Report for European Application No. 21174622.7 dated Oct. 19, 2021, 6 pages.

*Primary Examiner* — Chineyere D Wills-Burns
(74) *Attorney, Agent, or Firm* — Suiter Swantz pc llo

(57) ABSTRACT

A helmet mounted display is embedded in a visor assembly. The visor assembly comprises two molded sections that define portions for receiving waveguides. The optical components are disposed in a portion of the visor assembly and the entire assembly is attached by a hinge to the helmet. The visor assembly includes lateral clips to secure the visor assembly to the helmet, and a night-vision goggle attachment point.

12 Claims, 9 Drawing Sheets

(56) References Cited

U.S. PATENT DOCUMENTS

| | | | |
|---|---|---|---|
| 10,401,913 B2 | 9/2019 | Mendoza et al. | |
| 10,642,038 B1 | 5/2020 | Schuyler et al. | |
| 10,775,632 B1* | 9/2020 | Chapalamadugu | G02B 6/4203 |
| 2004/0145700 A1* | 7/2004 | Miniutti | G02C 7/12 |
| | | | 351/159.56 |
| 2009/0184889 A1 | 7/2009 | Kier et al. | |
| 2011/0240834 A1* | 10/2011 | Baudou | G02B 27/01 |
| | | | 250/214 AL |
| 2013/0305437 A1* | 11/2013 | Weller | A42B 3/221 |
| | | | 2/422 |
| 2014/0140653 A1* | 5/2014 | Brown | G02B 6/0033 |
| | | | 385/10 |
| 2014/0213917 A1* | 7/2014 | Hobeika | A61B 5/02438 |
| | | | 600/500 |
| 2014/0340424 A1* | 11/2014 | Ellsworth | G02B 5/30 |
| | | | 359/630 |
| 2015/0264229 A1* | 9/2015 | Teetzel | H04N 5/225251 |
| | | | 348/376 |
| 2015/0309316 A1* | 10/2015 | Osterhout | G06F 3/03547 |
| | | | 345/8 |
| 2016/0044276 A1* | 2/2016 | Shearman | H04N 5/772 |
| | | | 348/207.1 |
| 2016/0077338 A1* | 3/2016 | Robbins | G02B 27/4205 |
| | | | 359/489.08 |
| 2016/0085077 A1* | 3/2016 | Milea | G02B 27/0149 |
| | | | 359/632 |
| 2016/0167672 A1* | 6/2016 | Krueger | G16H 40/63 |
| | | | 340/576 |
| 2016/0209654 A1 | 7/2016 | Riccomini et al. | |
| 2016/0252728 A1* | 9/2016 | Mack | G09G 5/373 |
| | | | 351/158 |
| 2016/0291328 A1 | 10/2016 | Popovich et al. | |
| 2017/0307896 A1* | 10/2017 | Kovaluk | G06F 1/1639 |
| 2018/0114288 A1* | 4/2018 | Aldaz | A61B 5/0002 |
| 2018/0284440 A1 | 10/2018 | Popovich et al. | |
| 2019/0050051 A1* | 2/2019 | Cirucci | G02B 5/08 |
| 2019/0072768 A1* | 3/2019 | Trythall | G09G 3/003 |
| 2019/0133238 A1* | 5/2019 | Tsai | G02C 7/16 |
| 2019/0227347 A1* | 7/2019 | Jimenez | G02F 1/133382 |
| 2020/0018963 A1* | 1/2020 | Osterhout | G02B 27/0081 |
| 2020/0267359 A1* | 8/2020 | Seiler | G09G 3/32 |

FOREIGN PATENT DOCUMENTS

| | | |
|---|---|---|
| EP | 3441720 A1 | 2/2019 |
| WO | 2009136393 A1 | 11/2009 |

* cited by examiner

DISPLAY EMBEDDED VISOR HELMET MOUNTED DISPLAY

BACKGROUND

Typical head-mounted displays are very expensive visor-projected devices, or they are hazardous near-eye devices. Visor-projected devices impede the use of analog night vision goggles due to long eye relief. Near-Eye devices allow for the use of analog night vision goggles, but raise safety concerns because of the close proximity of the goggles to the near-eye device and the user's eyes in general. Certain conditions of flight or landing can cause goggles to disengage from their mount or move and impact near eye devices. Furthermore, step in visors with night-vision goggles or near-eye displays are disfavored by pilots; they cause undesirable reflections and glare, and do not allow the user to rub or touch their eyes.

It would be advantageous to have a safe, low cost solution for pilots that leverages near-eye devices that enable the safe use of night vision goggles and allow the user the ability to touch or rub their eyes.

SUMMARY

In one aspect, embodiments of the inventive concepts disclosed herein are directed to a helmet mounted display embedded in a visor assembly. The visor assembly comprises two molded sections that define portions for receiving waveguides. The optical components are disposed in a portion of the visor assembly and the entire assembly is attached by a hinge to the helmet.

In a further aspect, the visor assembly includes mounting attachment points to secure the visor assembly to the helmet.

In a further aspect, the visor assembly includes a night-vision goggle attachment point.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
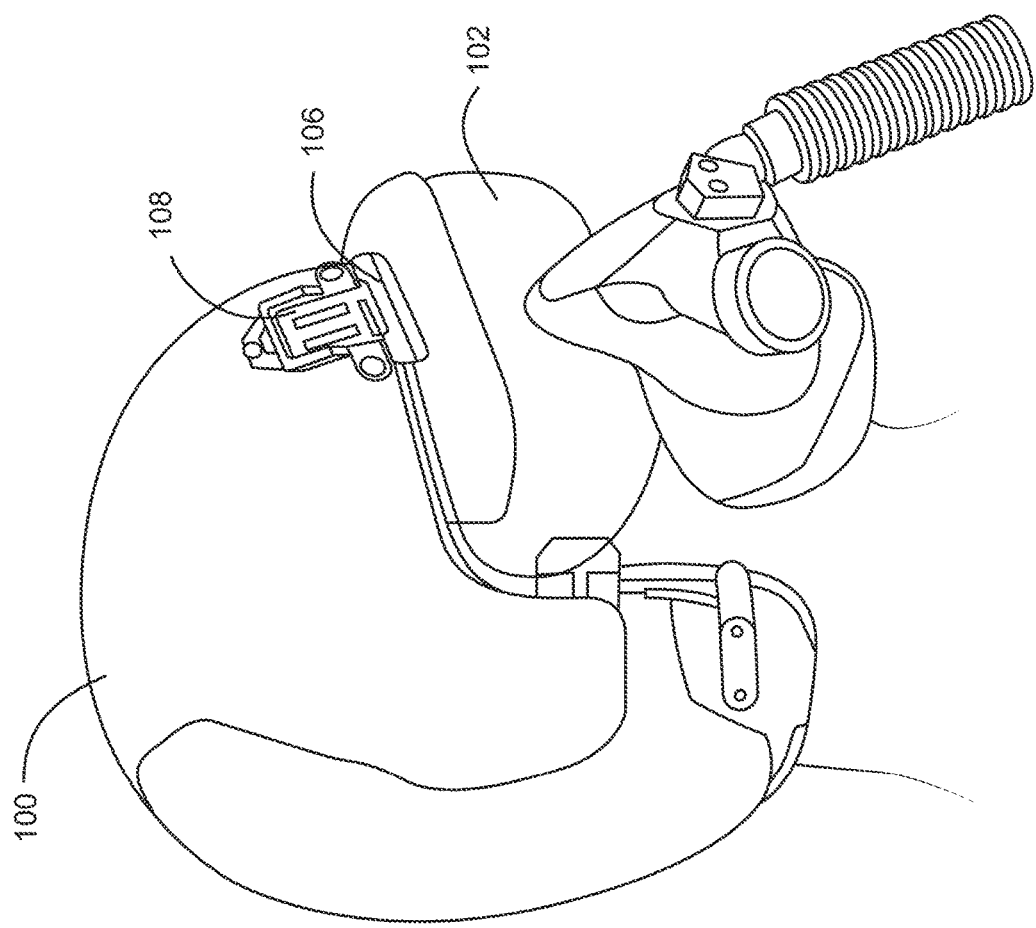
FIG. 1A shows a perspective, environmental view of a head-mounted display according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a helmet mounted display embedded in a visor assembly. The visor assembly comprises two molded sections that define portions for receiving waveguides. The optical components are disposed in a portion of the visor assembly and the entire assembly is attached by a hinge to the helmet.

Figure 1B:
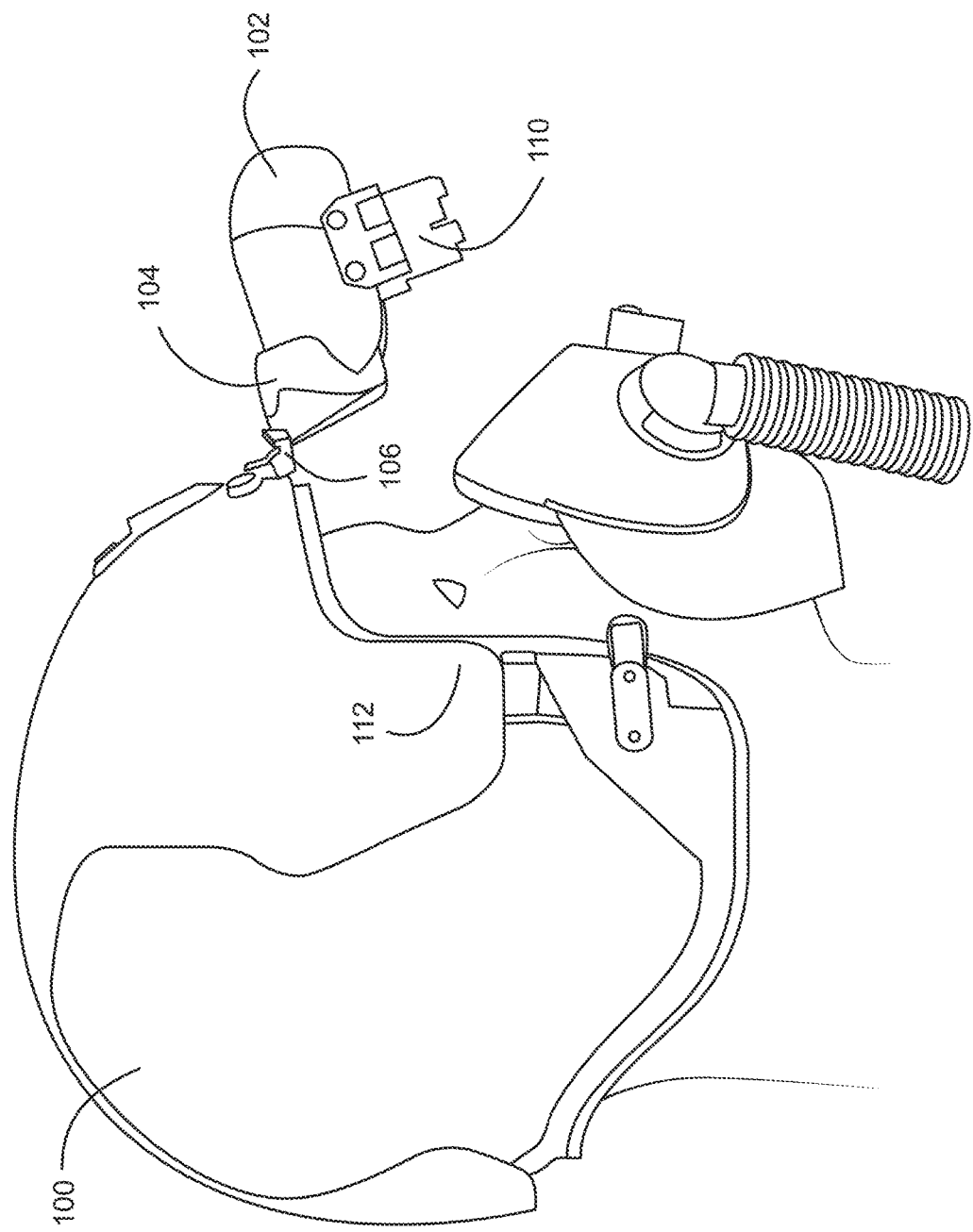
FIG. 1B shows a side, environmental view of a head-mounted display according to an exemplary embodiment.
Figure 1C:
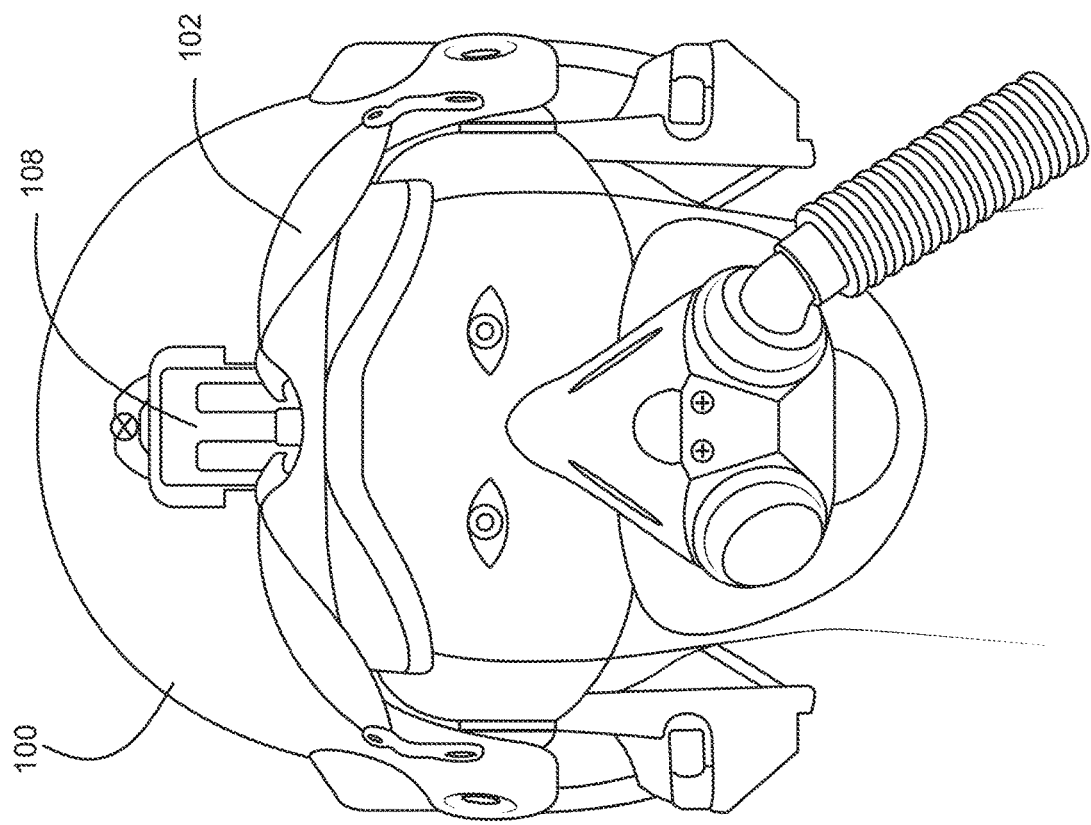
FIG. 1C shows a front, environmental view of a head-mounted display according to an exemplary embodiment.

Referring to FIGS. 1A-1C, perspective, side, and front, environmental views of a head-mounted display according to an exemplary embodiment are shown. A helmet 100 includes a visor assembly 102 with integrated optical and electronic components 104. The visor assembly 102 is connected to the helmet 100 at a hinge point 106.

The helmet 100 may also include a secondary attachment point 108 proximal to the hinge point 106. The secondary attachment point 108 may allow for the attachment of coordinated accessories such as night-vision devices.

In at least one embodiment, the visor assembly 102 includes lateral attachment elements 110 configured to engage corresponding attachment points 112 disposed in the helmet 100. The combination of the hinge point 106 and lateral attachments elements 110 allow the visor assembly 102 to be freely rotated, granting the user access to their eyes if necessary, but also narrowly restricting the visor assembly 102 when the attachment elements 110 are engaged with the corresponding attachment points 112 to locate embedded near-eye display elements in their proper, effective position.

Figure 2A:
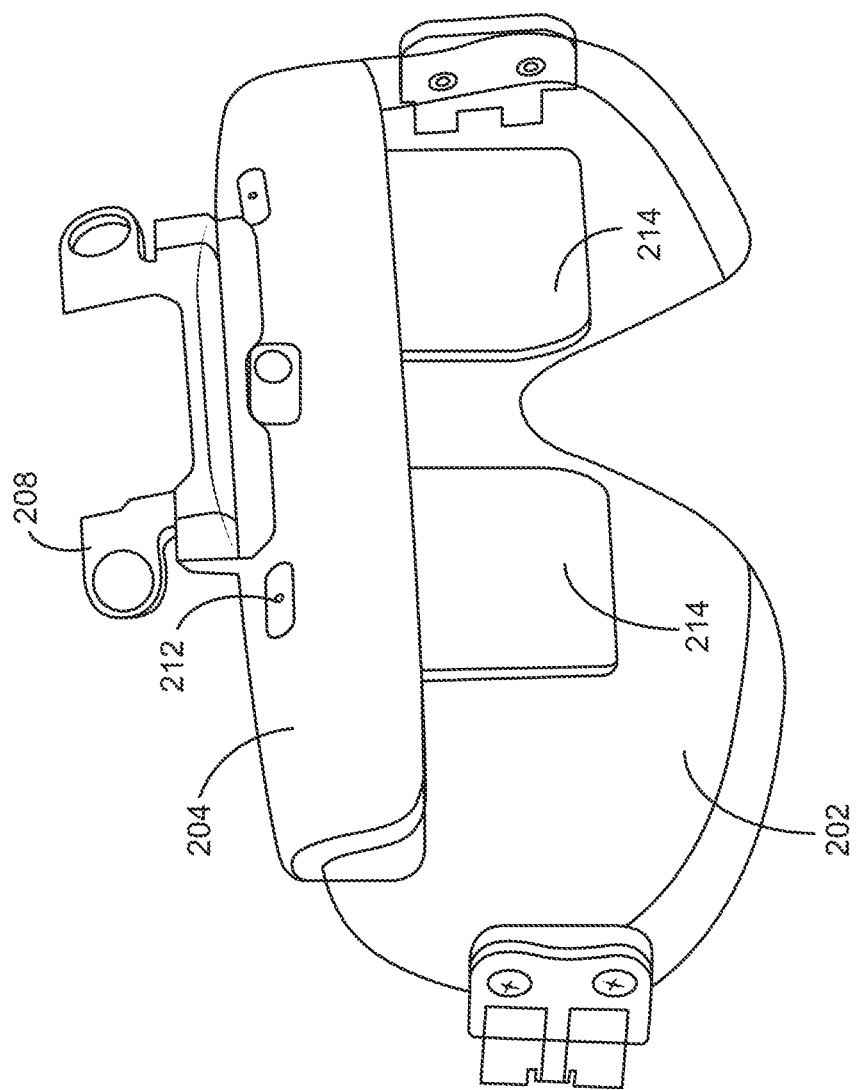
FIG. 2A shows a perspective view of a visor assembly according to an exemplary embodiment.
Figure 2B:
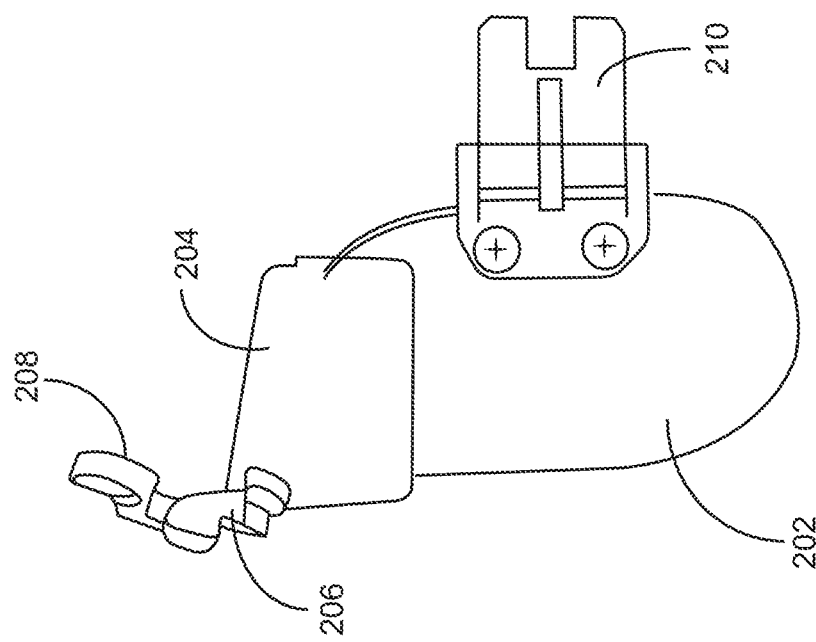
FIG. 2B shows a side view of a visor assembly according to an exemplary embodiment.
Figure 2C:
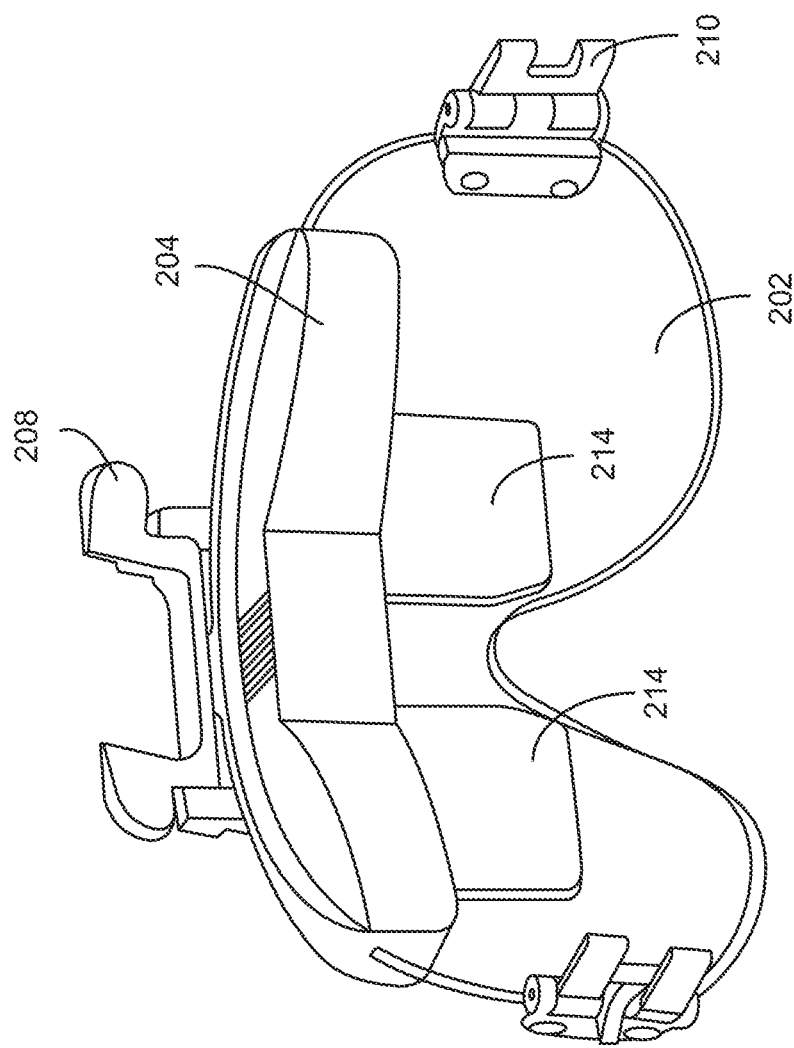
FIG. 2C shows a perspective view of a visor assembly according to an exemplary embodiment.

Referring to FIGS. 2A-2C, perspective and side views of a visor assembly 202 according to an exemplary embodiment are shown. The visor assembly 202 is configured to be rotatably attached to a helmet via a hinge point 206 including a helmet mounting mechanism 208. In at least one embodiment, the visor assembly 202 includes lateral attachment elements 210 configured to engage corresponding attachment points on the helmet.

In at least one embedment, the visor assembly 202 includes one or more waveguide elements 214 disposed within the body of the visor assembly 202. A component housing 204 contains the optical components and electronic components, integrated with the visor assembly 202. In at least one embodiment, the component housing 204 may contain certain functional components such as cameras 212, sensors, inertial trackers, etc. In at least one embodiment, the component housing 204 may include health monitoring sensors disposed on a user proximal surface. For example, blood oxygen sensors may be disposed in the component housing, proximal to the temples of the user to monitor that status of the use without the need for additional sensor packages.

In at least one embodiment, the component housing 204 may include one or more eye tracking cameras to facilitate interaction with the displays corresponding to the waveguide elements 214. The component housing 204 may also include one or more haptic feedback components to provide tactile feedback to the user.

In at least one embodiment, the component housing 204 may include head tracking elements such as LEDs or other fiducials disposed at known locations, rigidly associated with the locations of the waveguide elements 214 for tracking by cameras disposed in a cockpit. Alternatively, head tracking cameras or inertial sensors may be disposed in the component housing 204.

In at least one embodiment, each of the waveguide elements 214 may include an electrochromic tinting layer which may enhance contrast of images rendered via the waveguide elements 214 and the exterior view.

Figure 3:
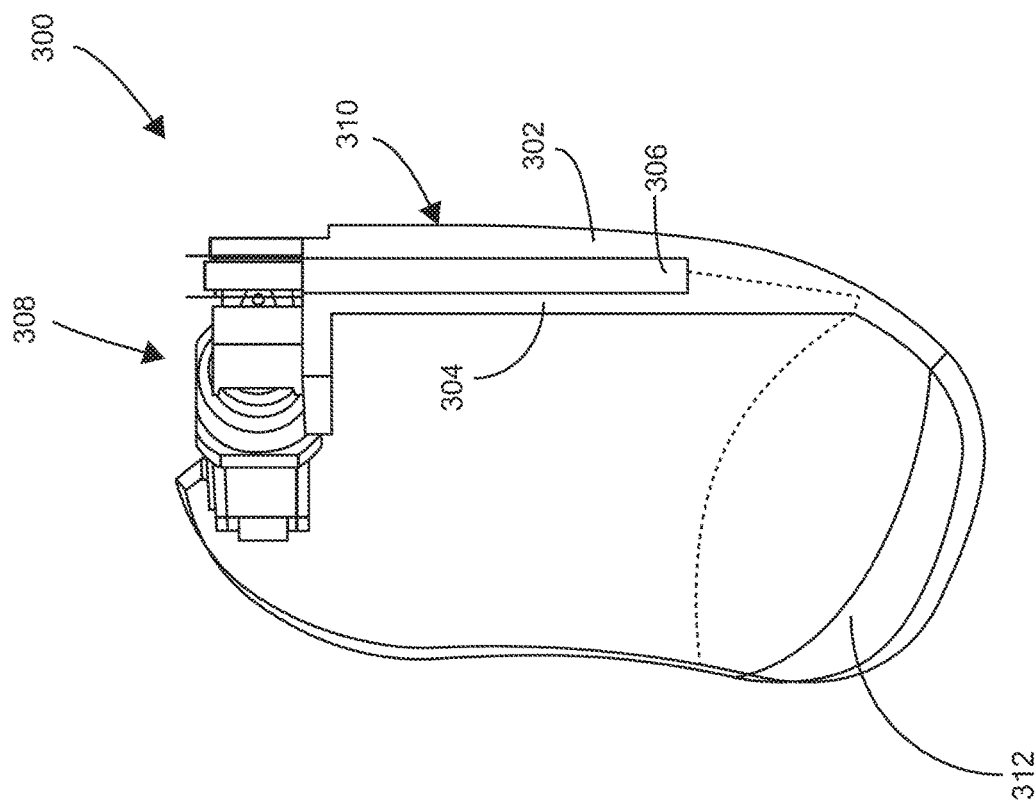
FIG. 3 shows a partial, detail view of a visor assembly according to an exemplary embodiment.

Referring to FIG. 3, a partial, detail view of a visor assembly 300 according to an exemplary embodiment is shown. The visor assembly 300 comprises an anterior visor element 302 and a posterior visor element 304. The anterior visor element 302 and posterior visor element 306 define one or more cavities for receiving corresponding waveguide elements 306. Each of the waveguide elements 306 engage corresponding integrated optical components 308. It may be appreciated that each cavity defines an air gap between the corresponding waveguide element 306 and components of the visor assembly 302. The air gap isolates the waveguide elements 306 during any normal, minor deformations or flexing of the visor assembly 300, facilitating optical operation and preventing damage to the waveguide elements 306. Alternatively, or in addition, each waveguide element may comprise an air spaced cover plate; the cover plates contact the visor assembly 300, eliminating the need for an air gap. Furthermore, if an electrochromic layer is disposed on the waveguide elements 306, an air gap with respect to the visor assembly 300 may not be needed for the waveguide elements 306 to work optically.

In at least one embodiment, the waveguide elements 306 may comprise an electrochromic tinting layer. Furthermore, the visor assembly 300 may include a photochromic layer or electrochromic layer to tint the visor assembly 300, and/or a base tint may be incorporated into the visor assembly 300. Alternatively, or in addition, where the visor assembly 300 comprises an anterior visor element 302 and a posterior visor element 304, one or more of the anterior visor element 302 and posterior visor element 304 may include a base tint, photochromic layer, or electrochromic layer. In at least one embodiment, a photochromic layer or electrochromic layer may be disposed at the interface of the anterior visor element 302 and posterior visor element 304, and the anterior visor element 302 and the waveguide elements 306. The photochromic layer or electrochromic layer may provide a uniform color shift across the whole peripheral view of the visor assembly 300.

In at least one embodiment, the visor assembly 300 may include a scratch resistant layer 310 disposed on one or more surfaces of the visor assembly 300. The scratch resistant layer 310 may comprise a diamond like carbon coating.

In at least one embodiment, the visor assembly 300, including the anterior visor element 302 and posterior visor element 304 where applicable, may define trimmable regions 312 configured to be removed to fit the user. The trimmable region 312 may comprise a different material than the polycarbonate visor, eliminating any variation of an off the mold visor encasement due to trimming. In at least one embodiment, the trimmable region 312 may be more pliable and of a softer material that may be affixed to the visor assembly subsequent to a molding process to make the molded encasement more consistent; internal stresses will not be released, potentially changing the shape of the visor assembly 300.

In at least one embodiment, the integrated optical components 308 and waveguide elements 306 may be replaceable.

A visor assembly 300 with embedded waveguide elements 306 may protect the user from ballistics and wind-blast, and from broken glass if the waveguide elements 306 were compromised.

Figure 4A:
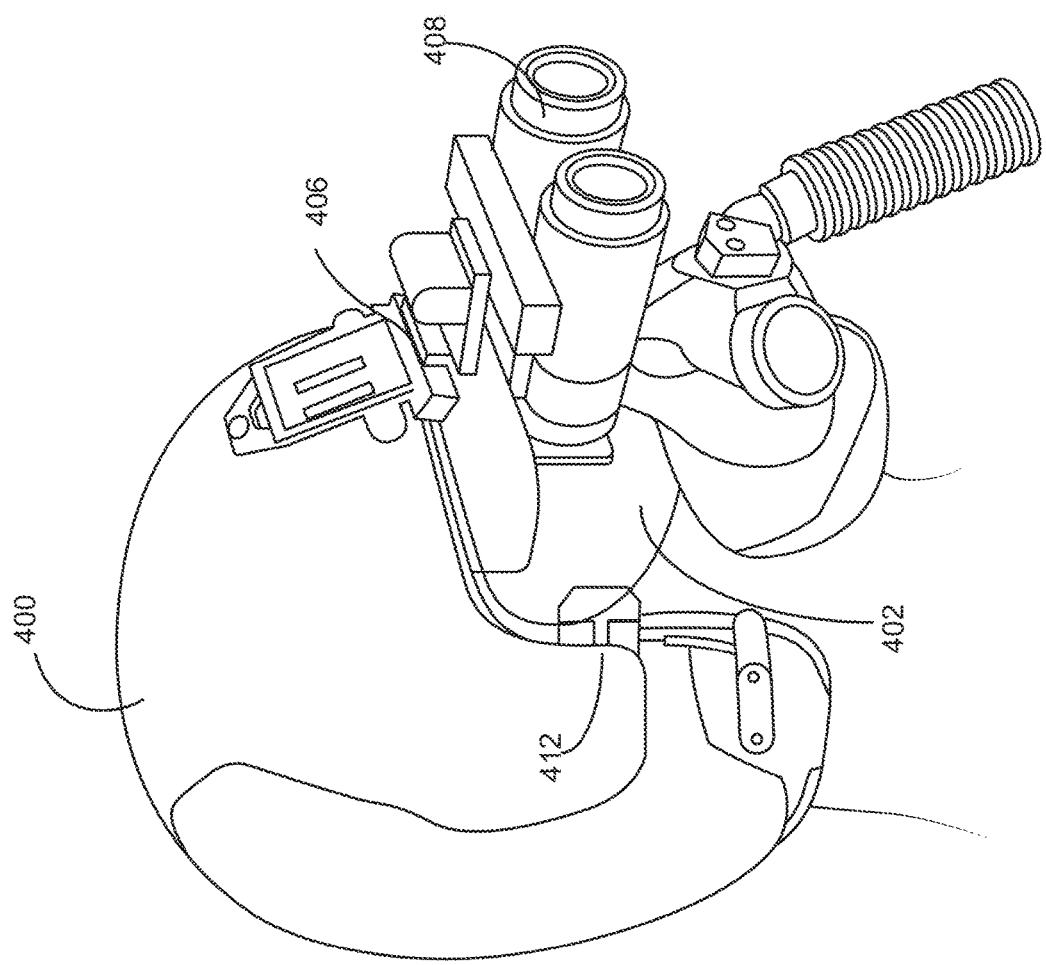
FIG. 4A shows a perspective, environmental view of a head-mounted display according to an exemplary embodiment.
Figure 4B:
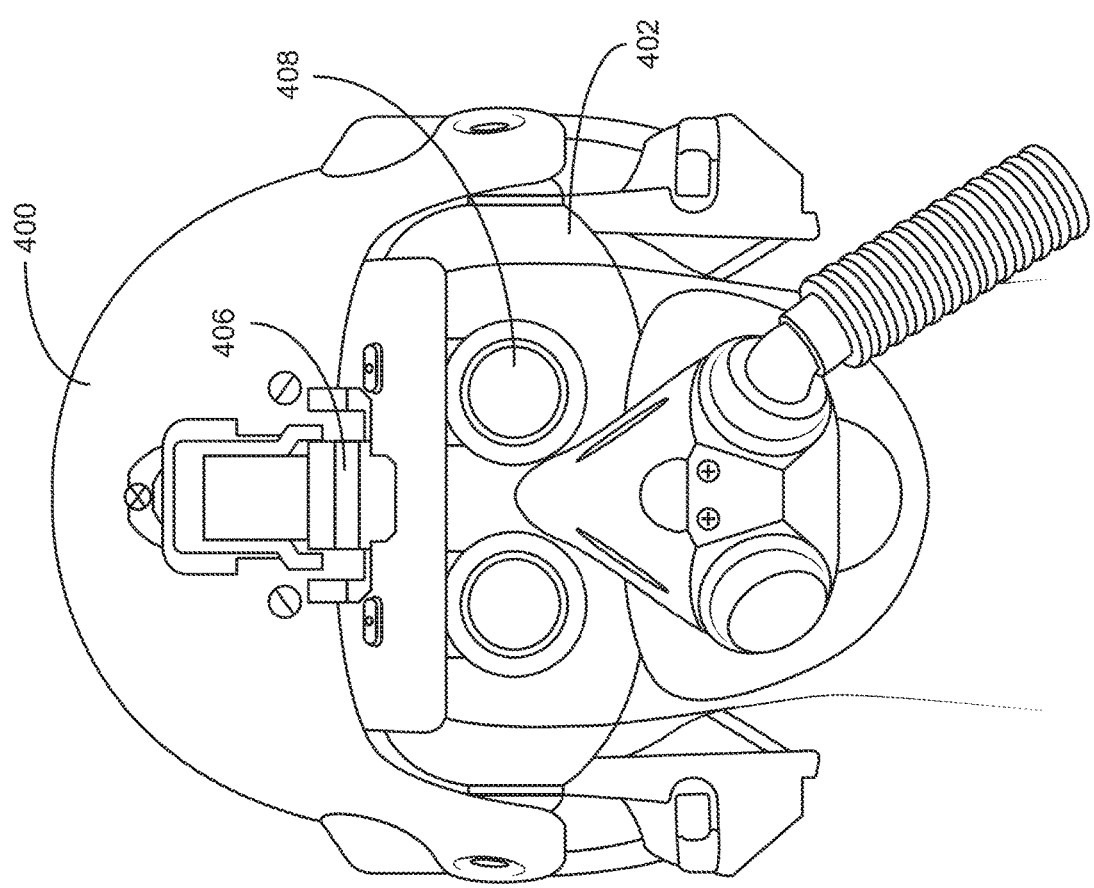
FIG. 4B shows a front, environmental view of a head-mounted display according to an exemplary embodiment.

Referring to FIGS. 4A-4B, perspective and front, environmental views of a head-mounted display according to an exemplary embodiment are shown. Where a helmet 400 includes a visor assembly 402 rotatably mounted via a hinge point 406, the visor assembly 402 may include lateral attachment elements that engage attachment points 412 on the helmet for stability. Accessories such as low-light or night vision devices 408 may be affixed to a secondary attachment point on the helmet 400 to work in concert with the visor assembly 402. Allowing for accessory attachment while the visor assembly 402 is completely engaged to the helmet 400 may protect the user's eyes.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A helmet mounted display comprising:
   a visor assembly comprising:
     a transparent visor body having an anterior visor element and a posterior visor element defining one or more waveguide cavities;
     one or more waveguides, each disposed in one of the one or more waveguide cavities, wherein each waveguide cavity is configured to form an air gap around the one or more waveguides;
     a component housing disposed at an edge of the transparent visor body;
     optical components disposed in the component housing, configured to engage the one or more waveguides;
     a blood oxygen sensor disposed in the component housing, proximal to a user's temple;
     one or more haptic feedback elements disposed in the component housing;
     one or more head tracking fiducials disposed on the component housing at known locations relative to the one or more waveguides; and
     a hinge element disposed on the component housing, configured to engage the helmet; and
   a secondary attachment point defined by the hinge element, configured to receive a night-vision device and position the night-vision device while the transparent visor body is in a down orientation.

2. The helmet mounted display of claim 1, further comprising one or more lateral attachment elements, each disposed at a lateral edge of the transparent visor body and configured to engage attachments points disposed on the helmet.

3. The helmet mounted display of claim 1, further comprising a photochromic layer at least partially disposed on an exterior surface of the anterior visor element.

4. The helmet mounted display of claim 1, wherein the transparent visor body comprises a base tint.

5. The helmet mounted display of claim 1, further comprising an electrochromic layer disposed on the one or more waveguides.

6. The helmet mounted display of claim 1, further comprising a scratch resistant layer disposed on at least one surface of the transparent visor body.

7. A visor assembly comprising:
   a transparent visor body having an anterior visor element and a posterior visor element defining one or more waveguide cavities;
   one or more waveguides, each disposed in one of the one or more waveguide cavities, wherein each waveguide cavity is configured to form an air gap around the one or more waveguides;
   a component housing disposed at an edge of the transparent visor body;
   at least one forward facing day camera disposed in the component housing;
   optical components dispose in the component housing, configured to engage the one or more waveguides;
   a blood oxygen sensor disposed in the component housing, proximal to a user's temple;
   one or more haptic feedback elements disposed in the component housing;
   one or more head tracking fiducials disposed on the component housing at known locations relative to the one or more waveguides; and
   a hinge element disposed on the component housing, configured to engage a helmet and defining a secondary attachment point for a night vision device.

8. The visor assembly of claim 7, further comprising one or more head tracking elements disposed in the component housing.

9. The visor assembly of claim 7, further comprising a photochromic layer at least partially disposed between the anterior visor element and the posterior visor element.

10. The visor assembly of claim 7, further comprising a photochromic layer disposed on an exterior surface of the transparent visor body.

11. The visor assembly of claim 7, further comprising an electrochromic layer disposed on an exterior surface of the transparent visor body.

12. The visor assembly of claim 7, further comprising a transparent trimmable element disposed along at least one edge of the transparent visor body.

* * * * *